(12) United States Patent
Wagner et al.

(10) Patent No.: US 7,785,401 B2
(45) Date of Patent: Aug. 31, 2010

(54) FLUID SEPARATION DEVICE

(75) Inventors: Jürgen Wagner, Asselfingen (DE); Dieter Grafl, Ulm (DE); Armin Praska, Rimpar (DE); Kai-Uwe Lemke, Ulm (DE)

(73) Assignee: REINZ-Dichtungs-GmbH, Neu-Ulm (DE)

( * ) Notice: Subject to any disclaimer, the term of this patent is extended or adjusted under 35 U.S.C. 154(b) by 683 days.

(21) Appl. No.: 10/591,773

(22) PCT Filed: Mar. 8, 2005

(86) PCT No.: PCT/EP2005/002432

§ 371 (c)(1), (2), (4) Date: Jul. 16, 2007

(87) PCT Pub. No.: WO2005/084780

PCT Pub. Date: Sep. 15, 2005

(65) Prior Publication Data

US 2007/0281205 A1 Dec. 6, 2007

Related U.S. Application Data

(60) Provisional application No. 60/593,019, filed on Jul. 30, 2004.

(30) Foreign Application Priority Data

Mar. 8, 2004 (DE) .................. 10 2004 011 176
Mar. 8, 2004 (DE) .................. 10 2004 011 177
Jul. 30, 2004 (DE) .................. 10 2004 037 157

(51) Int. Cl.
*B01D 45/12* (2006.01)

(52) U.S. Cl. .................. 95/272; 55/456; 55/457; 55/DIG. 5

(58) Field of Classification Search .................. 55/320, 55/337, 385.3, 417, 428, 434, 447, 456, 457, 55/461, 462, 465, DIG. 19, DIG. 5; 95/267, 95/269, 270, 272; 96/188, 189, 190
See application file for complete search history.

(56) References Cited

U.S. PATENT DOCUMENTS 767,721 A 8/1904 Swartwout (Continued)

FOREIGN PATENT DOCUMENTS

DE 42 18 851 A1 12/1993

(Continued)

*Primary Examiner*—Duane Smith
*Assistant Examiner*—Sonji Turner
(74) *Attorney, Agent, or Firm*—Marshall & Melhorn, LLC

(57) ABSTRACT

The present invention relates to a fluid separation device (10) for separating fluid, oil and oil spray from a gas. This fluid separation device (10) comprises a base carrier (21) in which fluid separator elements (20) in the form of flow-through tubes with worm-like segments (23) arranged therein, are integrated. The worm-like segments (23) at the same time form spiral flow paths (25) for the gas. They have a maximal length of half a pitch of the worm-like segment (23) so that the base carrier (21) together with the associated fluid separator elements (20) may be formed as one piece. Several base carriers may be arranged one after the other in a manner such that individual fluid separator elements of various base carriers form a common flow path for the gas.

23 Claims, 6 Drawing Sheets

U.S. PATENT DOCUMENTS

Figure 1:
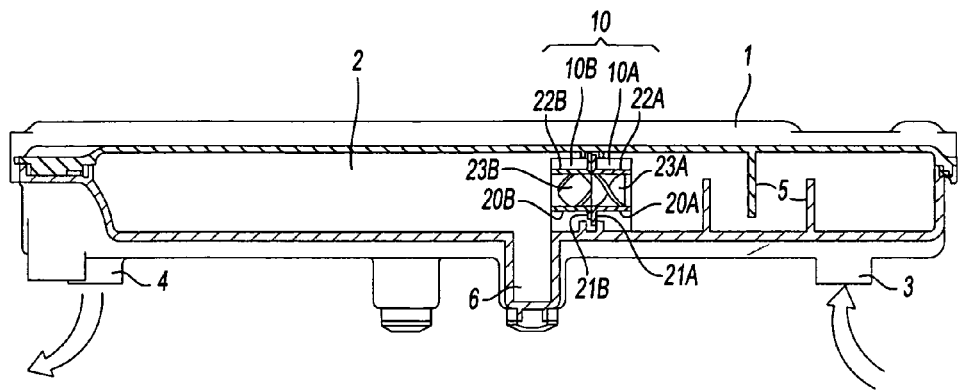

| | | | |
|---|---|---|---|
| 2,936,043 A | 5/1960 | Armstrong et al. | |
| 3,572,015 A * | 3/1971 | Brunner | 55/347 |
| 3,641,745 A | 2/1972 | Moore | |
| 3,893,914 A | 7/1975 | Bobo | |
| 3,915,679 A * | 10/1975 | Roach et al. | 55/347 |
| 3,966,443 A | 6/1976 | Okano et al. | |
| 4,158,449 A | 6/1979 | Sun et al. | |
| 5,035,730 A | 7/1991 | Kisaragi et al. | |
| 6,045,933 A * | 4/2000 | Okamoto | 429/17 |
| 6,648,939 B2 * | 11/2003 | Neuschwander et al. | 55/423 |
| 6,860,915 B2 | 3/2005 | Stegmaier et al. | |
| 7,004,987 B2 * | 2/2006 | Pikesh et al. | 55/347 |
| 7,163,626 B1 * | 1/2007 | Cuypers et al. | 210/512.3 |
| 2004/0003579 A1 | 1/2004 | Stegmaier et al. | |

FOREIGN PATENT DOCUMENTS

| | | |
|---|---|---|
| DE | 199 51 312 A1 | 5/2001 |
| DE | 101 27 820 A1 | 12/2002 |
| DE | 10 2004 011 176 A1 | 10/2005 |
| DE | 10 2004 011 177 A1 | 10/2005 |
| EP | 0 405 303 A1 | 1/1991 |
| GB | 1 206 007 | 9/1970 |
| JP | 8-284634 A | 10/1996 |

* cited by examiner

FLUID SEPARATION DEVICE

The present invention relates to a fluid-separating device, for separating fluid and/or fluid spray from a gas. Fluid-separating devices may be used, for example, for separating oil or oil spray from blow-by gases (crank housing gases, blow-through gases) of combustion engines. A further scope of application for fluid-separating devices is in the field of electrochemical cells, in particular polymer electrolyte membrane (PEM) fuel cells, in particular those which operate in a temperature range suitable for $H_2O$, in particular between 20° C. and 160° C.

Such fuel cells typically have powers between a few watts and several kilowatts. Such PEM fuel cells have a polymer membrane permeable to protons. This membrane needs to have a determined moisture content in order not to dry out and thus not to lose its ability to function. For this reason, the supplied reaction gases are previously humidified. For this, according to the state of the art, treated water in a humidifier is used for the corresponding supplied reaction gases on the anode and cathode side.

On the other hand, on the cathode side of the fuel cells pure water is produced as a reaction product. Thus, on the exit side an enormous water excess is present in the gases which are drained off. The water condenses immediately after leaving the fuel cell. In order to separate this water from the gases which are drained off, one applies fluid separation devices to lead this water back for humidifying.

According to the state of the art, common labyrinths, metal knitted fabrics, or cyclones are used for separating fluid.

For separating dust particles from gases, tubular separators are known which comprise a flow-through tube through which the gas is led. Worms are arranged in the flow-through tube which force the gas onto a circular path (orbit) along the inner periphery of the tubes and in this manner separate the particles on the inner wall of the tubes.

One fluid separator in the form of an oil separator or oil spray separator is known from DE 101 27 820 A1. There, a tubular separator is used which has a diameter of more than 5 cm. Accordingly, only a coarse separation of the oil from blow-by gases is effected in this spiral flow path. For this reason, a further fine separation device follows this separation device.

Further known fluid separators in the form of tubular separators, by way of example, are described in the patent applications of the same applicant with the application number DE 102004011176.6 and DE 102004011177.4, as well as corresponding international applications. Those separators consist of a base body through which flow-through tubes pass, and for each individual flow-through tube, a worm-like segment (spiral insert) is placed into the respective flow-through tube.

Typically, a worm is defined as a helical, or spiral thread passing around a middle axis.

The length of the segments depends on the conditions of installation and the demanded separation performance and is often a multiple of the pitch of the segment. A one-piece manufacture of such long segments together with the flow-through tubes, however, has great difficulties with regard to manufacturing technology and is even not possible for certain materials and manufacturing methods.

The base body, the flow-through tubes and the worm-like segments of the individual flow-through tubes are therefore separate or separately manufactured parts. Therefore the individual parts have to be securely connected to one another. In particular the individual worm-like segments need to be secured in the respective flow-through tubes.

Since several small fluid separator elements in a base body have a better efficiency than one large fluid separator element, and since several small fluid separator elements may be better adapted to the respective task (e.g. to an oil quantity to be separated in a motor or to a water quantity to be separated in a fuel cell, to the conditions of installation and likewise), the trend towards a larger number of individual fluid separator elements per base body or per fluid separation device continues.

It is the object of the present invention to provide a fluid separation device in which the number of parts is significantly reduced, wherein the fluid separation device nevertheless may be manufactured in an economical manner and with a low failure rate.

The fluid separation element according to the invention (and thus also the fluid separation device) belongs to the class of tubular separators since it is provided with a flow-through tube with an inlet and with an outlet for the gas.

Therefore, the basis of the fluid separation device according to the invention is a fluid separator element with a flow-through tube and a worm-like segment arranged therein.

According to the invention, it is characterised in that the flow-through tube and the worm-like segment have been manufactured as one piece, thus as a joint fluid separator element.

These fluid separator elements are integrated into a plate-like base body, wherein their flow through direction is advantageously essentially perpendicular to the plane of the plate of the base carrier. The individual fluid separator elements as well as the associated base carrier (base body) are designed as one piece, thus as a joint component.

The individual segments have a length (in the axial direction) of less than 0.5 pitches. However, the flow-through itself including an inlet and/or outlet region may have a larger length. The pitch here is defined as the length of the worm-like segment in the axial direction of the passage which the segment were to have with a complete revolution of the thread surfaces (=screw surfaces) by 360°.

Since the worm-like segments have a length of at the most up to half a pitch, each base carrier may be manufactured as one piece as a cast part, in particular as a die-cast or an injection moulded part. By way of this it becomes possible to manufacture the flow-through tube and the worm-like segment of a fluid separation element, or all fluid separation elements and their base carriers in the same manufacturing cycle. Thus many flow-through tubes may be manufactured in a single work step with an integrated worm-like segment in the same subject. Very small inner diameters for the flow-through tubes, for example 3 mm, are possible as result of this method.

In one advantageous embodiment, at least two base carriers manufactured in such a manner are arranged bordering one another such that the individual fluid separator elements (or their flow-through tubes) of the individual base carriers are allocated to one another such that in each case one fluid separator element or flow-through tube of a base carrier, with the associated fluid separator element or flow-through tube of the at least one adjacent base carrier, forms a common flow path for the gas, the flow path reaching through all base carriers arranged on one another.

It is particularly advantageous when the rotational direction (clockwise or counterclockwise) of the gas which is produced by the worm-like segments changes between two base carriers arranged adjacent to one another: if a first segment has a counterclockwise rotational direction of the thread surfaces of the worm-like segment in the gas flow direction, then the subsequently arranged worm-like segment has a clockwise rotational direction of the thread surfaces or of the associated flow path or paths.

It has now been surprisingly ascertained that with such a serial arrangement of at least two such fluid separator segments, in which a common flow path for the gas is formed by the flow-through tubes and worm-like segments of individual fluid separator elements of base carriers arranged one after the other the individual segments advantageously have a length corresponding to at the most 0.5 times their pitch, the separation may be carried out in an extremely efficient manner. This is especially the case when the rotational direction of successive segments is in opposite directions to one another, so that the gas must be deflected from the one rotational direction to the other rotational direction within the serially connected flow-through tubes of two fluid separator elements.

With these worm-like segments being serially connected with an opposite rotational direction, impingement surfaces arise on which the fluid or the fluid spray is separated in an excellent manner. The thread surfaces of the worm-like segments may also be arranged such that the thread surfaces of the subsequent segment project into the flow path formed by a thread surface of the preceding segment. Moreover, it is particularly advantageous if the thread surface of the first segment projects roughly up to the middle of and into the flow path formed by the thread surface of the second adjacent segment.

However, base carriers with segments which are aligned in the same direction may be arranged adjoining one another.

The outlet-sided edge of a first segment and the inlet-sided edge of the subsequently arranged second segment, the edges being arranged adjacent one another, may advantageously be arranged rotated (twisted) relative to one another about the central axis of the common flow path by an angle, in particular by an angle between 45° and 135° particularly preferred by about 90°.

Thus, with the first-mentioned fluid separation device, the rotational direction of the segments (spirals) changes in each case between adjacent base carriers. Therefore for the complete separator unit it is sufficient to serially assemble only two base carriers reversed in rotational direction, in order to achieve a high separating performance for the gas flow on account of the change in rotational direction or the impingement surfaces which they entail respectively. Thus irrespective of the number of base carriers arranged one after the other, the whole fluid separation device may be constructed merely from two different types of base carriers. Where there are lower demands with respect to the separation performance, or for the application as a coarse separator, one may also use only one plate-like base carrier.

Advantageously each of the separator elements has at least two flights or flow paths. For this, the flow-through tube is subdivided perpendicularly to the longitudinal axis such that two or more flights which are separate from one another arise. For this a thread surface of one segment is sufficient. However the arrangement of several interwoven thread surfaces is also possible.

In a further advantageous embodiment at least one of the flow paths has a minimum cross section between 1 mm² and 800 mm². It is particularly advantageous if such a flow path has a minimum cross section of $\geq$2 mm² and/or $\leq$400 mm², preferably $\geq$4 mm² and/or $\leq$200 mm².

It is advantageous that at least one flow path runs at an angle of about 45° to the axial direction. Preferably, at least two of the consecutive, worm-like segments of the fluid separation devices adjacent to one another—are arranged directly connecting to one another or have a positive-fit in the axial direction. The segments may not be, however, arranged over the whole flow-through tube, but only at the beginning, in the middle and at the end of a flow-through tube. In the latter case thus also adjacent segments may be arranged somewhat separated from one another in the axial direction.

The flow may enter into the flow-through tube axially, or under certain circumstances also tangentially, and may exit the tube axially and/or tangentially. An entry and exit at a limited angle with respect to the axial direction and/or the tangential direction is possible. However, from a technical point of view, an axial entry and/or exit of the gases is advantageous.

Advantageously, the inlet of the flow-through tube is arranged in a manner such that the flow-through tube has an inflow at an angle $\leq$45° to the axial direction or at an angle of $\leq$45° to the tangent on the periphery of the flow-through tube. Advantageously, the outlet is arranged in a manner such that the gas flows out of the flow tube at an angle $\leq$45° to the axial direction or at an angle $\leq$45° to the tangent on the periphery of the flow-through tube.

Figure 2:
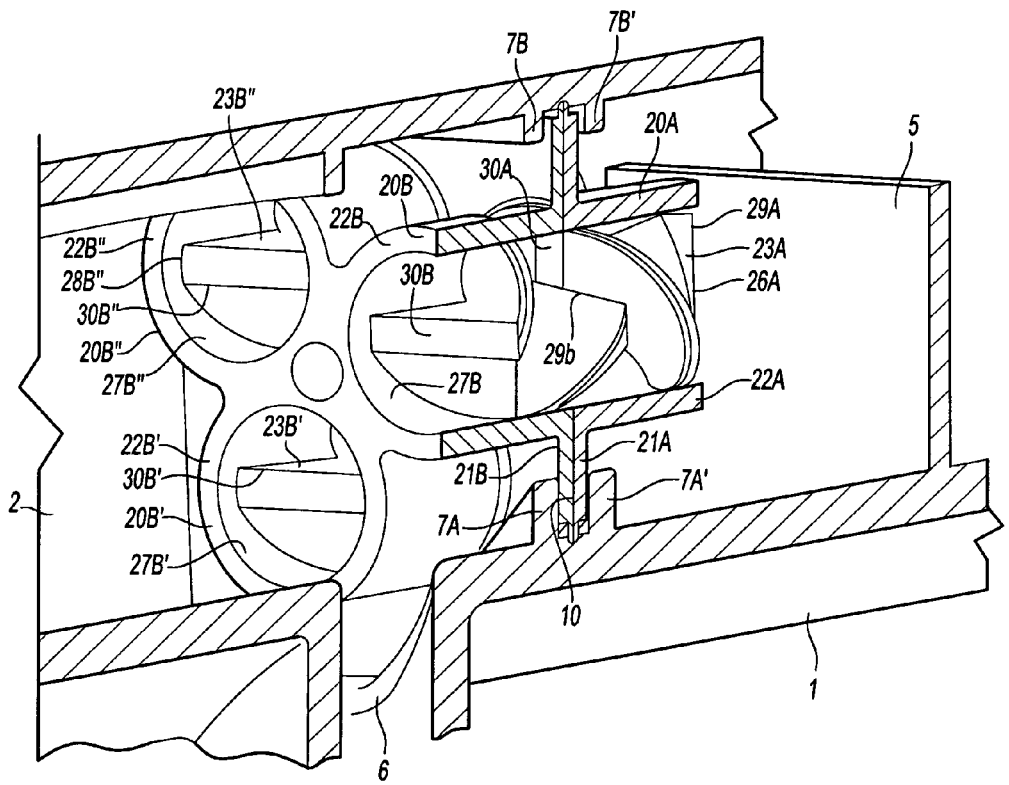

Flow-through tubes and/or flow paths arranged next to one another advantageously have the same diameter and thus the same pressure drop over the length of the flow-through tube or the flow path. As shown in FIG. 2, the tubes may be arranged such that a wall of one of tubes forms a wall of another tube. More particularly, the tubes may be arranged such that only a part of a wall of one tube forms part of a wall of another tube.

Advantageously, at least one of the flow-through tubes at its thinnest location has an inner diameter $\leq$30 mm. In a preferred embodiment, the inner diameter is $\leq$25 mm. In a more preferred embodiment, the inner diameter is $\leq$12 mm. In a most preferred embodiment, the inner diameter is $\leq$7 mm. Advantageously, a flow-through tube and/or a flow tube formed of several serially arranged flow-through tubes, at its thinnest location or on its entire length has an inner diameter of $\geq$1 mm. In a preferred embodiment, the inner diameter is $\geq$2 mm and $\leq$10 mm.

In a further advantageous embodiment, the wall thickness of the thread surface of a segment at its thinnest location or on its entire length is more than 1/20 and/or less than half, advantageously more than 1/10 and/or less than 1/3 of the diameter of a flow-through tube or flow tube.

In a further advantageous embodiment, the pitch of a segment is $\geq$1/8-fold and/or $\leq$10-fold, advantageously $\geq$1/4- and/or $\leq$5-fold, advantageously $\geq$1/2 and/or $\leq$twice, the diameter of the associated flow-through tube.

Further, flow-through tubes may be widened, advantageously conically widened, at the beginning and/or at their end, in order to minimise the pressure loss in the flow-through tube. A widening at the end of a flow-through tube furthermore reduces the gas speed so that at possible edges of the thread surfaces at the end of the last segment, no droplet shear and thus atomisation of the already separated fluid is effected.

The diameter of one or several consecutive segments and/or of the flow tube assembled to its final length may alter in sections or over the entire length.

In another embodiment, a segment of a fluid separation element (or also several or all serially arranged segments of the fluid separator elements associated with one another, of the serially arranged base bodies) in the axial direction, at the beginning and/or at the end has a thickened axial core of the segment or segments or end segments, the core being thickened in a conical manner towards the beginning or end.

In a further embodiment for at least one of the segments or for several or all serially arranged segments of a common flow tube, the distance between the core of the worm-like segment or the worm-like segments and the wall of the flow tube reduces in the axial direction.

In a further advantageous embodiment for one segment or for several or all serially arranged segments of a common flow tube, the radius of the core of the worm-like segment or of the worm-like segments and/or the diameter of the flow-through tube or of the common flow tube reduces in the axial direction.

In a further embodiment for at least one segment or for several or all serially arranged segments of a common flow tube, the pitch within the segment or the segments at least in sections increases or reduces in the axial direction.

In a further advantageous embodiment, at least the flow-through tube of a fluid separator element, or a common flow tube of fluid separator elements arranged serially, as an inlet region, may comprise a starting section and/or as an outlet region an end section, in which no worm-like segments are arranged.

Such a starting or end section advantageously has a length of more than twice the diameter of the flow-through tube.

The individual base carriers may advantageously be designed as a flat plate (for example in a cylinder-shaped manner). Basically their shape is deduced from the installation situation with its spatial conditions and may be selected in an infinite manner. The height of the plate (in the direction of the axial direction of the flow-through tubes of the individual fluid separator elements) is then advantageously less than about 1.5 times, preferably less that once and very particularly preferred less than 0.5 times the pitch of the worm-like segments of the individual fluid separator segments.

If several base carriers are arranged serially then it is advantageous if this is effected in a positive fit manner to one another. In this case, the base carriers may be connected to one another, for example glued, screwed and/or locked. In order to fix the relative position of the base carriers to one another, it is advantageous to design the base carriers in a manner such that they comprise means with which the relative position of two base carriers arranged adjacent to one another is defined relative to one another. This may be effected for example by way of tongue and groove elements and the like, which are provided on surfaces of successive base carriers, where the surfaces face one another. It is also possible to provide the base carrier with a bore which passes through all base carriers, into which an arbor may be introduced. The bore and the arbor may, for example, likewise have tongues and grooves which then determine the position of the individual base carriers.

The base carriers for their part may be fastened via rails in the component surrounding them, for example in a water separator in a fuel cell or a valve cover for a combustion engine, wherein the size and arrangement of the rails is selected such that in each case one rail receives a base carrier with one of its edges. In this manner, by way of the arrangement of the individual rails, the number of the base carriers as well as their relative position may likewise be fixed. Such a rail system further contributes to the modularity of the present invention.

In order drain off the fluid separated at the wall of the serially connected flow-through tubes, their wall, advantageously in the axial direction may comprise grooves and channels. It is also possible in the axial direction to attach webs for leading the separated fluid to the outlet of the flow-through tube. The thread surfaces may as well comprise slots and/or channels which drain off the separated fluid. It is particularly favourable if the grooves run in the outer edges of the thread surfaces.

The fluid separation device according to the invention has a series of advantages:
- the number of the required individual parts for the fluid separation device (worm-like segments, flow-through tubes or fluid separator elements) may be significantly reduced;
- this leads to considerable cost savings and simplification of the assembly;
- furthermore securing the individual elements can be dispensed with;
- the separation intensity is maximised in comparison to other cyclone-like separators. This particularly results when a multitude of fluid separator channels (formed by at least one or by a plurality of fluid separator elements arranged serially and allocated to one another) operate in a parallel manner to one another;
- a compact, integrated fluid separation device with a low pressure loss, a high capacity and stable gas flows is provided;
- the number of the individual flow-through tubes or common gas flow paths may be selected depending on e.g., the conditions within a fuel cell, where more water occurs on the cathode side than on the anode side, on the blow-by characteristics of a motor, on the maximal pressure drop and/or the maximal permissible fluid transfer.

If the flow-through tubes have a diameter $\leqq 30$ mm, then these may also be installed into flat valve bonnets (valve covers). With fuel cells there exists significantly more possibilities of incorporation so that no extreme limitations with respect to dimensioning are required.

The core (heart) of the worm-like segment may furthermore be removed in the inlet and/or in the outlet region, in particular with the (seen in the gas flow direction) first and/or last flow-through tube of a flow path. A further reduction of the flow pressure losses is effected by way of this. A cone-like removal of the core is particularly favourable so that a free flow region is present in the middle axis of the segment or the serially connected segments.

A few examples of the present invention are described in the following. Here, as in the following, the same or similar reference numerals are used for the same or similar elements so that the description to some extent is not repeated.

Figure 3:
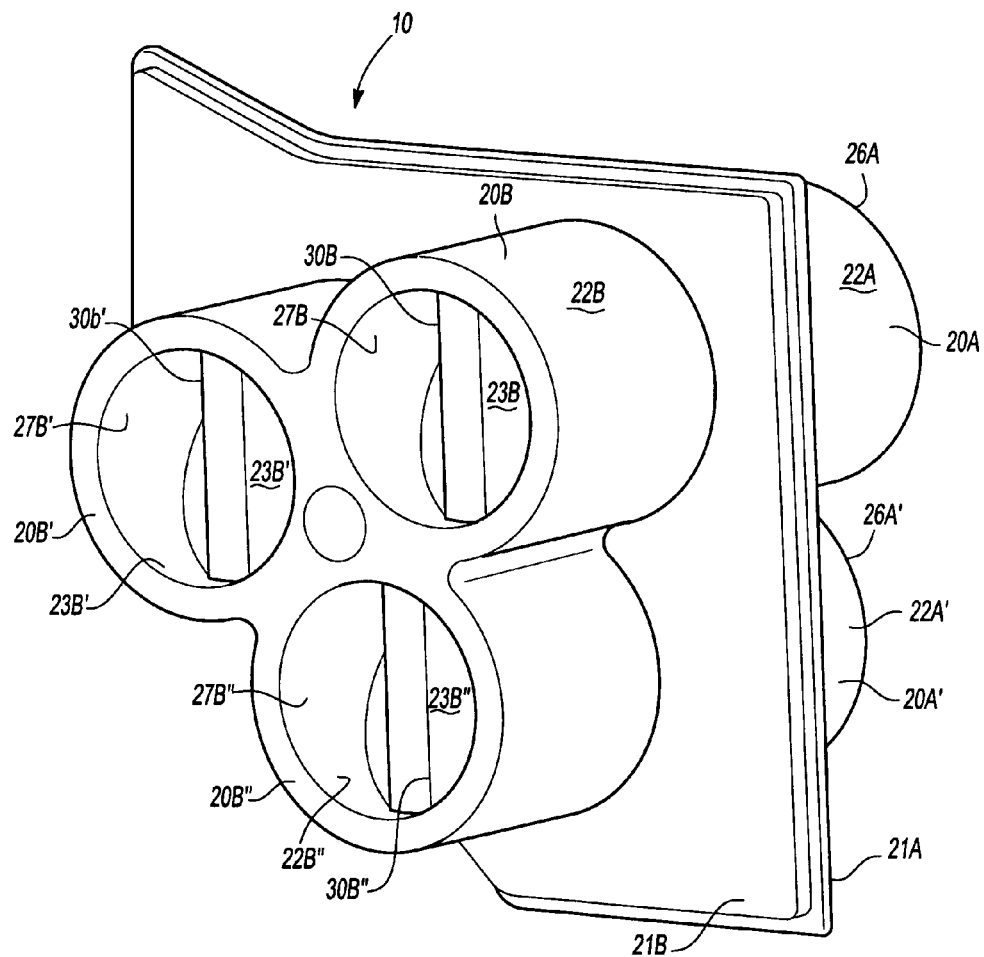
Figure 4:
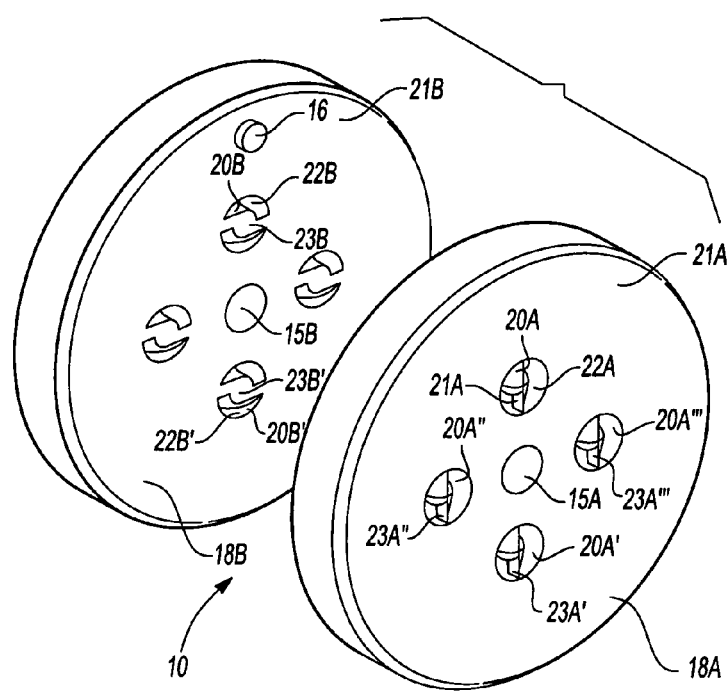
Figure 5:
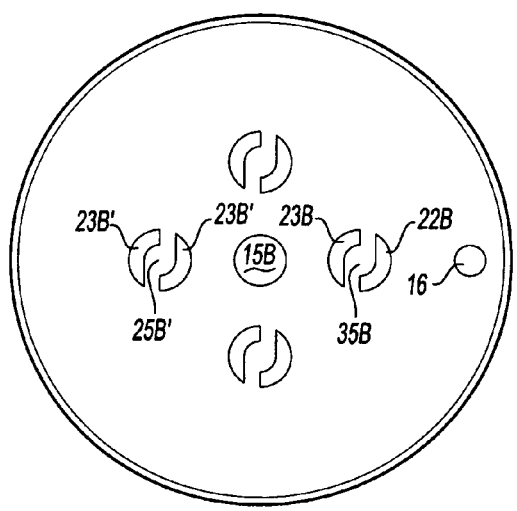
Figure 6:
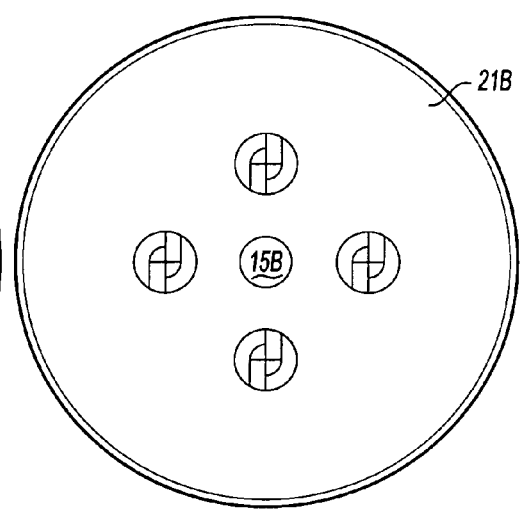
Figure 8:
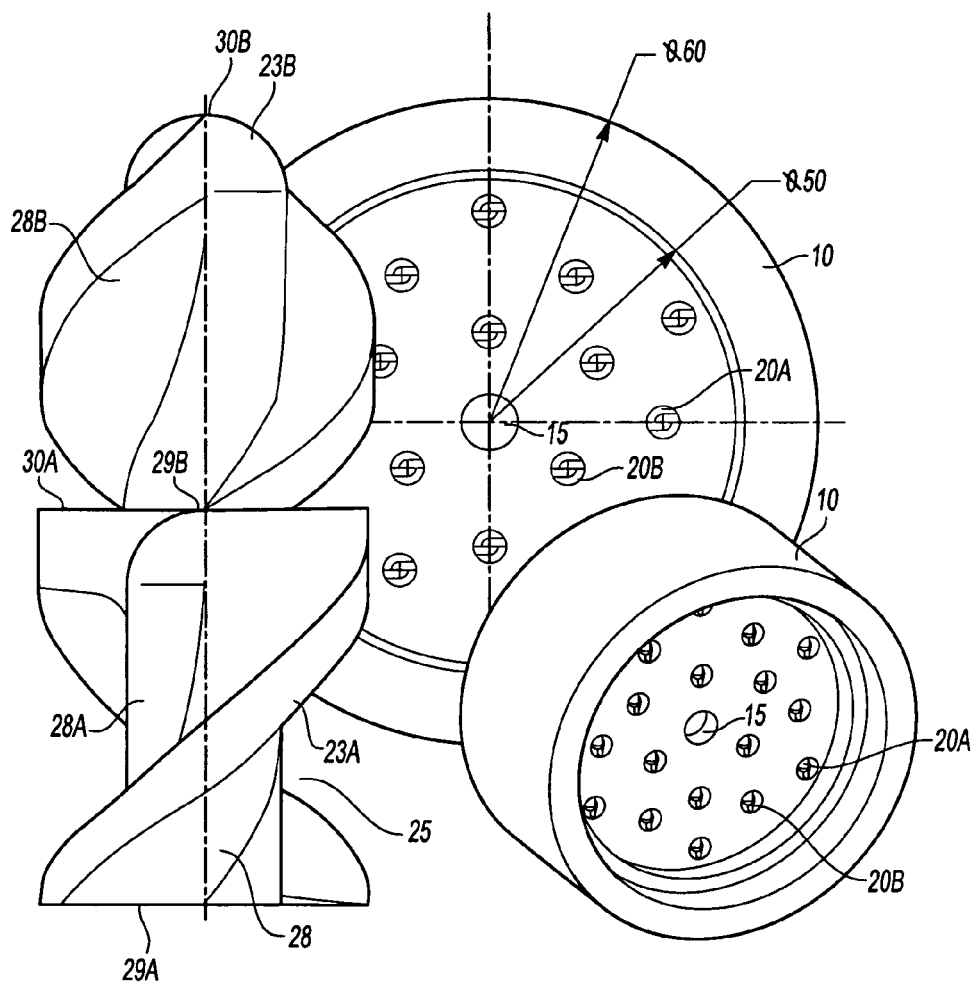
Figure 9:
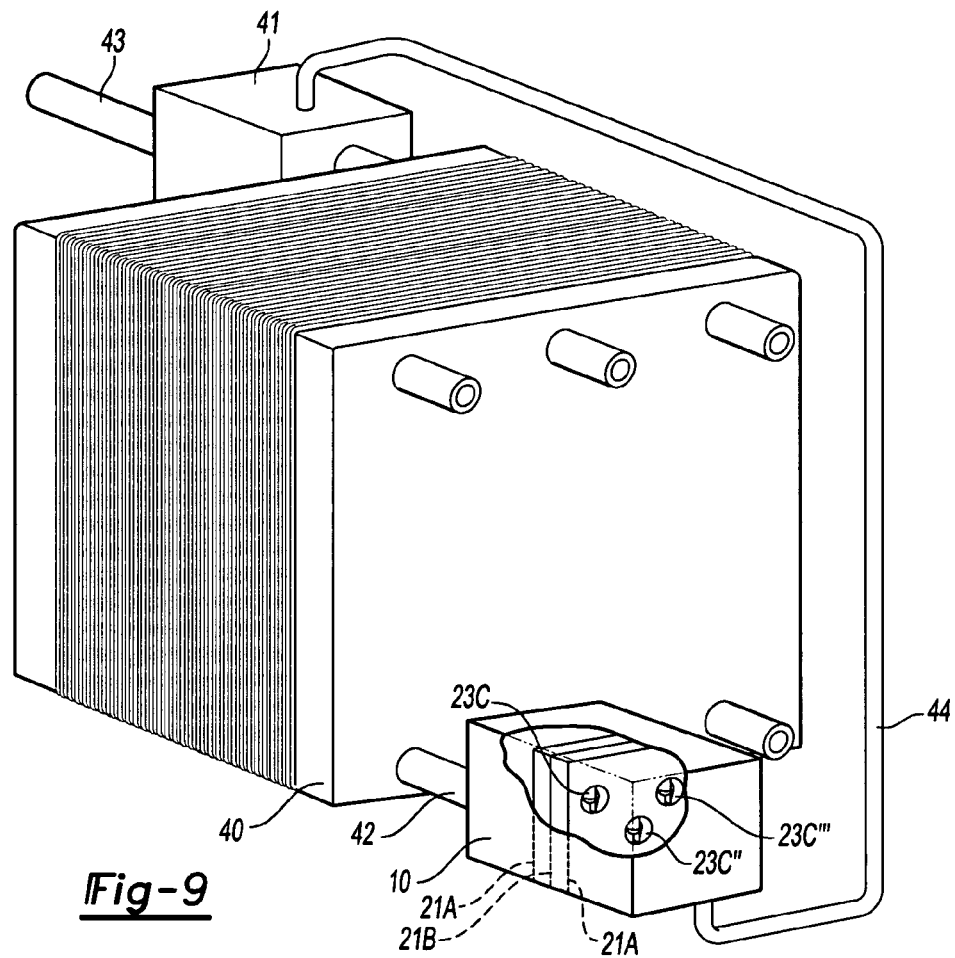

There are shown in:
FIG. 1 a cylinder head cover with installed oil separators;
FIG. 2 a section through a cylinder head cover;
FIG. 3 an oil separator with 2 base carriers;
FIG. 4 two base carriers together with integrated fluid separator elements for forming an oil separation device according to the invention;
FIGS. 5 and 6 the plan view in the axial direction of the base carrier according to FIG. 4;
FIG. 7 various shapes of worm-like segments;
FIG. 8 an oil separation device with two base carriers in a perspective view and a plan view as well as two worm-like segments of two oil separator elements, the segments bordering one another and arranged serially in a common flow tube;
FIG. 9 an electrochemical cell with a fluid separation device; and
FIG. 10 a single base carrier with integral fluid separator elements.

FIG. 1 shows a cylinder head cover 1 which may be attached onto a cylinder head of a combustion engine. This cylinder head cover 1 comprises a cavity 2 which has an inlet 3 and an outlet 4 for gases. The blow-by gases via the inlet 3 are blown out of the crank case of the combustion engine into the cavity 2 and leave this cavity 2 via the outlet 4. The crank case gases are freed from entrained oil or oil spray within this cavity 2. This oil spray or the separated oil is collected in a siphon 6 and led back continuously into the oil sump or is also led back in portions.

Impingement plates 5 are arranged in the cavity 2 of the cylinder head cover 1 directly behind the inlet 3. The impingement plates effect a course separation of oil droplets. The impingement plates 5 are arranged offset such that a labyrinth-like path of the gas through the impingement plates results.

A separation device 10 according to the invention is arranged in the gas path behind the coarse separator of the impingement plate 5 and this device consists of two individual elements 10A and 10B. Each of the elements 10A and 10B comprises a plate-like base carrier 21A and 21B respectively. In each element 10A, 10B, at least one separator element 20A, 20B is arranged. FIG. 1 depicts the elements 20A, 20B in cross-section. The base carriers 21A and 21B are fastened in rails which are formed in the housing of the cylinder head cover 1. The separator elements 20A and 20B each comprise a flow-through tube 22A, 22B in each of which a worm-like segment 23A and 23B, respectively, is arranged. The blow-by gases enter into the flow-through tubes 22A and 22B and are set into a rotating movement by way of the worm-like segments 23A and 23B. By way of this the oil, or the oil spray, is spun out of the gas and is separated on the wall of the flow-through tube 22A and 22B. The oil which is separated in this manner is transported along the wall of the flow-through tube 22A and 22B in the gas direction and subsequently runs into the siphon 6. Within the cylinder head cover, the flow-through tubes 22A and 22B at the same time represent the only (single) passage between the inlet and outlet 4 for the blow-by gases.

As is to be recognised in FIG. 1, the worm-like segment 23A is installed and fixed in a rotated manner such that the gas is set into a clockwise rotational movement (clockwise direction). The segment 23B arranged after this has a rotational direction in the other direction so that there the rotational direction of the gas is reversed into a counterclockwise rotation (opposite to clockwise direction). In particular, on account of such a reversal of the rotational direction, there results a particularly good separation rate of the separation device 10 represented here. It must be noted that the worm-like segments do not rotate themselves, but are fixed within the flow-through tubes.

FIG. 2 shows a corresponding cylinder head cover 1 in a cut-out, wherein here a cavity 2 is likewise arranged in the valve cover 1, and in which a separation device 10 is likewise located. A siphon 6 for collecting the separated oil is likewise arranged after the impingement plates 5 and the separation device 10 in the gas flow direction.

From FIG. 2 it can be recognised how the separation element 10 is constructed of two plate-like base carriers 21A and 21B. The two base carriers 21A and 21B are arranged in rail-like holders 7A, 7A' and 7B, 7B', respectively. Each of the base carriers furthermore comprises three separator elements 20A arranged next to one another transversely to the gas flow direction, for the base carrier 21A as well as 20B, 20B' and 20B" for the base carrier 21B. The further arrangement of the flow-through tubes 22A' and 22B, 22B' and 22B" as well as the correspondingly marked worm-like segments 23A as well as 23B, 23B'and 23B"corresponds to that of FIG. 1. Here a reversal of the rotational direction of the gas flow between the base carriers 21A and 21B is also effected.

The worm-like elements, explained here with the example of the worm-like element 23A, have an inlet 26A of the flow-through tube 22A, an inlet-side edge 29A and as explained with the example of the flow tube 22B, an outlet-side edge 30B on an outlet 27B. The conditions in the other flow tubes correspond to these and therefore are not described separately.

In FIG. 3 it may be particularly well recognised that the outlet-side edge 30A of the separator element 20A and the inlet-side edge 29B of the separator element 20B are offset by 90° to one another, so that the inlet-side edge 29B projects into the flow path of the gas of the separator element 20A. In this way, a particularly effective separation of oil and oil spray may be effected.

FIG. 3 then shows two base carriers 21A and 21B of a separator device 10 as is for used for example in FIG. 2. Here, as in all previous and subsequent figures, similar or corresponding elements are indicated with similar or corresponding reference numerals (only modified by the additions such as A, B, ', '', '''). Here, it is to be recognised that the base carrier 21A and 21B are plate-like and the flow-through tubes 22A, 22A', 22A" etc. project from the respective base carriers 21A and 21B, respectively. The flow-through tubes contain worm-like segments, e.g. 23B, 23B', 23B", . . . . With regard to the invention, it is particularly advantageous that the respective base carrier 21A and 22B with the through flow tubes 22A, 22A', . . . and 22B, 22B', . . . arranged in it respectively, and the worm-like segments arranged in the respective flow-through tubes, may be manufactured as one piece for each base carrier 21A and 21B respectively. This may only be accomplished in an economical way and manner by way of injection moulding or die casting, for example, if the worm-like segments have a length which is smaller or equal to half a pitch of the respective worm-like element. Longer worm-like segments with regard to manufacturing technology would only be capable of being manufactured at an extremely great expense.

FIG. 4 shows an oil separation device 10 which comprises two, in each case flat, cylinder-shaped base carriers 21A and 21B. The two base carriers 21A, 21B, for an improved representation, are sketched at a distance to one another in the direction of the axis of symmetry of the cylinder. In this oil separation device 10 according to the invention, the two plate-like base carriers 21A, 21B, however, are arranged directly bordering one another such that they form a common cylinder with a cylinder height which corresponds to the thickness of the two plate-like base carriers in the direction of the axis of symmetry. Four oil separator elements (20A, . . . , 20B, . . . ) with their flow-through tubes 22A, . . . , 22B, . . . together with the associated worm-like segments 23A, . . . , 23B, . . . are integrated into each base carrier 21A, 21B. The four oil separator elements 20A, . . . , 20B . . . are arranged on a circle about the cylinder axis in the plane perpendicular to the cylinder axis. The worm-like segments 23A, . . . , 23B, . . . in each case have a length corresponding to half the pitch. Each base carrier 21A, 21B, its associated flow-through tubes 22A, . . . and its associated worm-like segments 23A, . . . is in each case manufactured as one piece as a common die-cast part. Both base carriers 21A, 21B may be integrated into a single oil separation device 10 in that the two cylinders 21A, 21B are arranged directly bordering one another in a manner such that the two cylinder axes coincide. Then two flow-through tubes 22A and 22B or 22A'and 22B', with one of the first base carrier 21A and one of the second base carrier 21B, form a common flow path for the gas. Thus, the flow-through tubes 22A and 22B together with their worm-like segments 23A and 23B form a common flow path. Since then all worm-like segments 23A, 23A', . . . of the one base carrier 21A have a counterclockwise rotational direction and since all worm-like segments 23B of the other base carrier 21B have a clockwise rotational direction, and since the worm like segments 23A, 23B and 23A', 23B', . . . (of the different base carriers 21 and 21B), which are allocated to one another and which form a common flow path, are twisted to one another by 90° with respect to the central axis of the respective flow path 22, in the oil separation device 10 for each common flow path at the height of the transition from one into the other base carrier, an impingement surface is formed in each case which improves the separation of the oil.

In order to achieve exact fitting alignment of the two base carriers 21A, 21B in the oil separation device 10, the base carrier 21B on the surface which borders the other base carrier 21A is provided with a bulge 16 in the form of a cylindrical projection. This bulge 16 engages with a positive fit into a corresponding indentation (not shown) in the form of a cylinder-shaped recess into the base body 21A. The bulge 16 and the indentation serve for preventing a mutual rotation of the two base carriers 21A, 21B about the common cylinder axis in the completed assembled condition. The bulge 16 and the indentation thus serve to ensure the common flow paths through the oil separation device 10 and to fix the relative arrangement of the individual worm-like segments 23A, 23B of each individual common flow path.

In place of only one bulge 16 and associated indentation, embodiment examples with a plurality of lock-in possibilities may be used. These embodiments, e.g., with a circular arrangement of an even number of worm-like segments with alternately arranged clockwise and counter clockwise rotating worm-like segments, offer the possibility of using the same basic modules for the manufacture of a fluid separator with a flow direction which is the same or inverse to one another, in the serially arranged worm-like segments.

If, for example, in FIG. 4 in each case two separator elements 20A, 20A' which lie opposite one another are provided with worm-like segments 23A, 23A' which are in the same direction, for example clockwise, and the remaining separator elements 20A" and 20 which lie opposite one another are provided with worm-like segments 23A" and 23 which both are twisted counterclockwise, then by way of serial arranging two such base carriers 21A one may effect any change in the rotational direction. This is because two base carriers may be arranged serially such that between them no change in the rotational direction in the respective separator elements is effected, or also by way of installing one of the base carriers offset by 90° such that a change in rotational direction between the serially arranged worm-like segments in the two base carriers is effected. The modularity may then be realised in a particularly simple manner if rails are arranged at the location of installation for serially arranged base carriers, in order to accommodate the carriers. By way of different orientation of the base carriers on insertion or introduction into the corresponding rails one may then infinitely select which type of rotational direction and thus change in rotational direction between individual base carriers is to be effected.

Apart from an arrangement of successive worm-like segments 23, which alternate with respect to the rotational direction as in the introduced case, one may also arrange equally directed worm-like segments one after the other, wherein in both cases these are twisted relative to one another from base body to base body in each case by 90° about the central axis of the common gas flow path 22. Bores 15A, MB are incorporated centrally into the cylinder-shaped base carrier 21A, 21B for aligning the cylinder axes of the base carrier. Guide pins may be introduced into these bores 15A, 15B in an exactly fitting manner.

The guide bores 15A, 15B may in each base body 9 be provided each with a fin (spring) in the direction of the cylinder axis. The corresponding guide pin may then have a notch or groove corresponding to this fin so that by way of the guide pin one may achieve the desired positioning of the two base carriers 21A, 21B relative to one another with regard to the rotational position about the common cylinder axis. A tongue and groove may also be arranged on the respective other component in order to achieve the desired anti-twist protection.

In the shown base carriers 21A, 21B, the axial directions of the individual oil separator segments 20 or flow-through tubes 22 are directed parallel to the cylinder axis of the base carrier 21A, 21B. For achieving an inclination of the flow paths for draining off fluid even when the vehicle has been positioned obliquely, the complete oil separation device 10 may be installed tilted by an angle a>0° to the horizontal (angle a=angle between the central cylinder axis of the oil separation device and the horizontal). Alternatively to this, the individual oil separator elements 20 may be integrated into the base carrier 21 in a manner such that the axial directions of the oil separator elements 20 form an angle >0° to the cylinder axis of the base carrier 21.

FIGS. 5 and 6 show views of the two sides of the base carrier 21B represented in FIG. 4.

Figure 7A:
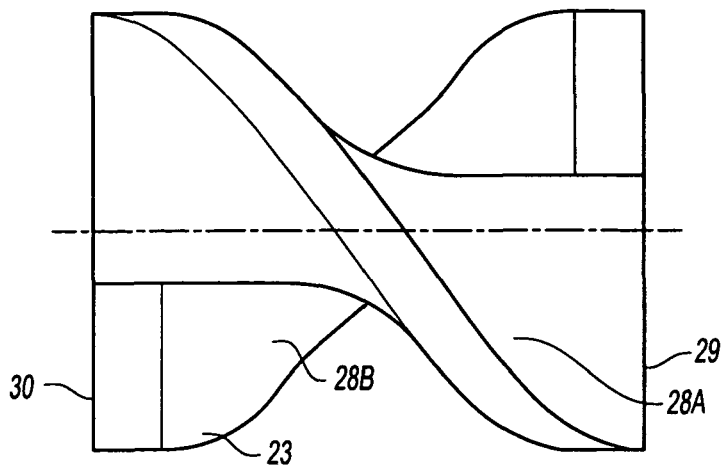
Figure 7B:
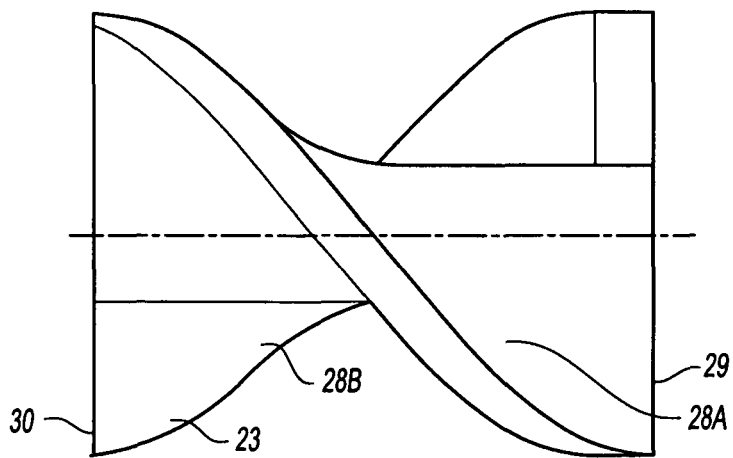
Figure 7C:
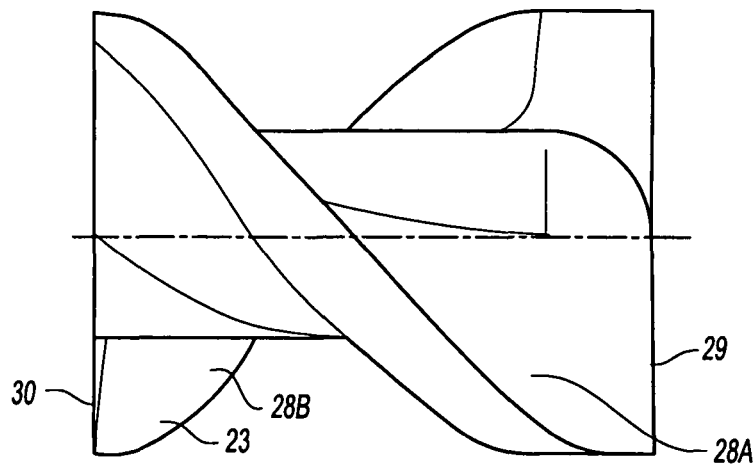

FIG. 7, in part pictures 7A, 7B, and 7C, shows worm-like segments 23 which all rotate clockwise (clockwise direction). One may recognise that these worm-like segments 23 comprise edges 30 on the inlet side and edges 29 on the outlet side. The worm-like segments 23 at the same time form two thread surfaces or thread surfaces 28A and 28B and divide the flow path of the gas into two flights. In the part figures A, B, C various variants are represented, wherein the inlet-side as well as the outlet-side bevelled edge 30 and 29 respectively are present in FIG. 7A. The inlet-side edge in FIG. 7B is designed differently, whilst in FIG. 7C the outlet-side edge 29 and the inlet-side edge 30 have a different shape. FIG. 7C, in contrast to the FIGS. 7A and 7B, has a stabilising core.

FIG. 8 depicts a view of two worm-like segments 23A and 23B as may be applied in a joint flow path 25 by way of two base carriers of an oil separation device which are arranged one after the other. Both worm-like segments 23A, 23B have a length corresponding to 0.5 times their pitch as well as the same rotational direction (clockwise).

FIG. 8 furthermore shows a cylinder-shaped separation device 10 in a lateral view in which two base carriers are integrated with a positive fit such that they are fixed to one another.

FIG. 8 depicts a plan view of the separation device 10 with a central guide bore 15 and at a different distance to this central guide bore, a plurality of oil separator elements 20A, 20B, . . . .

FIG. 9 shows a PEM fuel cell 40, which on the anode side, is supplied through a conduit 43 with fuel, for example, molecular hydrogen $H_2$. The cathode-side reaction products are drained off via a conduit 42. The cathode-side reaction product is essentially $H_2O$. With fuel cells, a humidification of the supply of fuel on the anode side through the conduit 43 as well as the cathode-side supply of fuel ($O_2$, air or likewise) which here is not shown, is required, so that the membrane does not dry out and lose its function. For this, and shown by way of the example of the conduit 43, this conduit runs through a device for gas humidification. In this device, the anode-side fuel is humidified.

On the other hand, on the cathode side (pure) water is produced as a reaction product so that an enormous excess of water is present in the conduit 42 at the exit side. This water which is drained off with the reaction gases via the conduit 42 may be removed from this waste gas. For this, according to the invention, a water separator device 10 is arranged in the conduit 42. Three base carriers 21A, 21B, 21C drawn by way of example contain water separator elements 20C, 20C' and 20C" which are drawn only in a schematic form are located in this separation device. The separator elements in the base carriers 21A and 21B which are mounted upstream on the flow path of the gas, are not shown here, but together with the separator elements 20C, 20C', 20C" in each case form joint flow paths. With such a separator the water droplets which condense indirectly after leaving the fuel cell in the conduit 42 may be separated.

Until now the water produced on the cathode side escapes into the outer air and expensively prepared water must be used in order to humidify the supplied reaction gases.

The pure water which in this manner is removed from the reaction gas may now however be led to the humidification device 41 via a water return conduit 44 so that no water needs to be supplied externally to the complete system in order to maintain the circulation of water.

The base carriers 21A, 21B and the fluid separator elements 20A, 20B may be comprised of glass, plastic and/or metal. As a plastic, the base carriers 21A, 21B and the fluid separator elements 20A, 20B may be one or more of a thermoset, thermoplast and an elastomer with a Tg>=80° C. The base carriers 21A, 21B and the fluid separator elements 20A, 20B may also be comprised of a polyamide material.

Figure 10:
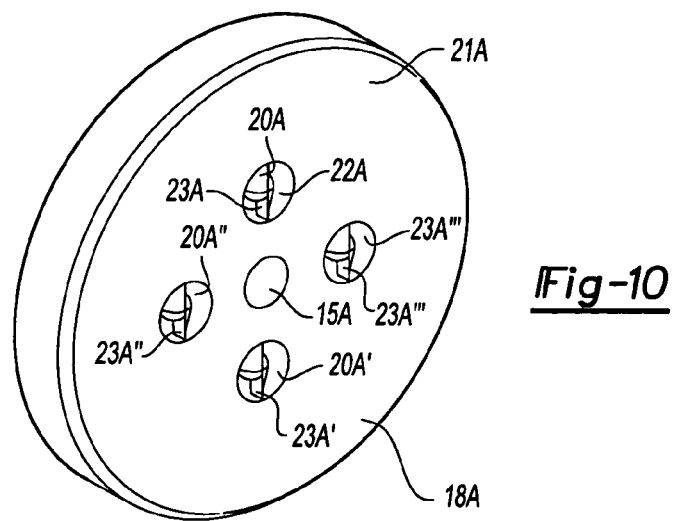

Finally, FIG. 10 provides a depiction of the embodiment of the invention discussed above wherein a single base carrier is utilized by itself. For economy of description and to demonstrate the adaptability of the base carrier for use with another base carrier or for use by itself, the base carrier 21A discussed above and depicted in FIG. 4 is depicted alone. The base carrier 21A of FIG. 10 can be readily used in place of the two base carrier embodiments depicted herein by simply removing the second base carrier.

The invention claimed is:

1. A fluid separation device for separating fluid or fluid spray from a gas comprising:
   at least two base carriers having a generally plate-like shape and being arranged in series,
   at least one fluid separator element arranged in each base carrier, wherein the fluid separator element comprises a flow-through tube with a gas inlet, a gas outlet, and a worm-like segment disposed between the gas inlet and the gas outlet, the worm-like segment having screw thread surfaces defining at least one worm-like gas flow path with an inner wall of the flow-through tube,
   wherein the at least one separator element of a first one of the at least two base carriers is aligned with the at least one separator element of a second one of the at least two base carriers to form a generally continuous flow path,
   wherein the worm-like segment has a length not greater than 0.5 times a pitch of the worm-like segment, and further wherein each fluid separator element and the corresponding base carrier are integrally formed as one piece.

2. The fluid separation device of claim 1, wherein each base carrier comprises two or more separator elements formed adjacent one another in a plane of the base carrier, the two or more separator elements being integrally formed with the base carrier as one piece.

3. The fluid separation device of claim 1, wherein said worm-like segment of said flow-through tube divides said flow-through tube into two flow paths.

4. The fluid separation device of claim 3, wherein a rotational direction of a worm-like segment of a separator element of a first base carrier is in a same direction as a worm-like segment of a separator element of a second base carrier.

5. The fluid separation device of claim 3, wherein a rotational direction of a worm-like segment of a separator element of a first base carrier is in an opposite direction as a worm-like segment of a separator element of a second base carrier.

6. The fluid separation device of claim 3, wherein an outlet-side edge of the at least one thread surface of a first worm-like segment of the at least one separator element of the first base carrier is rotated at an angle with respect to an inlet-side edge of the at least one thread surface of the worm-like segment of the at least one separator element of the second base carrier, the angle being between 45° and 135°.

7. The fluid separation device of claim 3, wherein the at least two base carriers are connected by a positive fit.

8. The fluid separation device of claim 3, wherein the at least two base carriers are one or more of glued, screwed and locked to one another.

9. The fluid separation device of claim 3, wherein the at least two base carriers each include at least one feature for fixing the relative position of the at least two base carriers to one another.

10. The fluid separation device of claim 9, wherein the at least one feature for fixing the relative position of the at least two base carriers to one another comprises at least one bulge on a first base carrier and at least one recess on a second base carrier that corresponds to the at least one bulge on the first carrier.

11. The fluid separation device of claim 1, wherein said plate-like base carriers and said at least one fluid separator element are comprised of one or more of glass, plastic and metal.

12. The fluid separation device of claim 1, wherein said plate-like base carriers and said at least one fluid separator element are comprised of one or more of a thermoset, thermoplastic and an elastomer.

13. The fluid separation device of claim 12, wherein said plate-like base carriers and said at least one fluid separator element are the one or more of a thermoset, thermoplastic and an elastomer has a Tg>=80° C.

14. The fluid separation device of claim 1, wherein said plate-like base carriers and said at least one fluid separator element are comprised of a polyamide material.

15. A method of forming a fluid separation device, comprising
   providing at least two base carriers, each being separately integrally formed and each having a plate-like shape;
   integrally forming at least one fluid separator element in each base carrier;
   providing each fluid separator element with an integrally formed flow-through tube having an axial gas inlet, an axial common gas and fluid outlet;
   locating an integrally formed worm-like segment between the gas inlet and the gas outlet;
   forming the worm-like segment with screw thread surfaces, said surfaces defining at least one gas flow path with an inner wall of the flow-through tube;
   providing the worm-like segment with a length not greater than 0.5 times a pitch of the worm-like segment;
   arranging said base carriers in series with one another;
   aligning the at least one separator element of a first one of the at least two base carriers with the at least one separator element of a second one of the at least two base carriers; and
   forming a generally continuous flow path with said aligned separator elements.

16. The method of claim 15, wherein integrally forming each of said base carriers with their respective said at least one fluid separator elements comprises co-extruding said base carriers and said at least one fluid separator elements.

17. The method of claim 15, wherein integrally forming said base carrier and said at least one fluid separator element comprises a die cast method or injection molding method.

18. The method of claim 15, wherein the at least one base carrier and the at least one fluid separator element are formed of at least one of a glass material, a plastic material, a metal material, a thermoset material, a thermoplast material, an elastomer material, and a polyamide material.

19. The fluid separation device of claim 3, wherein an outlet-side edge of at least one of said surfaces of said screw thread surfaces of a first worm-like segment of said at least one separator element of said first base carrier is rotated at an angle with respect to an inlet-side edge of at least one of said surfaces of said screw thread surfaces of a second worm-like segment of said at least one separator element of said second base carrier, said angle being about 90°.

20. The fluid separation device of claim 3, wherein an outlet-side edge of at least one of said surfaces of said screw thread surfaces of a first worm-like segment of said at least one separator element of said first base carrier is not rotated with respect to an inlet-side edge of at least one of said surfaces of said screw thread surfaces of a second worm-like segment of said at least one separator element of said second base carrier.

21. A fluid separation device for separating fluid or fluid spray from a gas, comprising:
   one plate-like base carrier having a generally plate-like shape;
   at least two fluid separator elements integrally formed in said carrier as one piece, wherein said fluid separator elements each comprise a flow-through tube with an axial gas inlet, a common axial gas and fluid outlet, and a worm-like segment having screw thread surfaces defining a worm-like gas flow path with an inner wall of the flow-through tube;
   wherein a wall of one of said flow-through tubes of one of said fluid separator elements forms a wall of one of said flow-through tubes of another of said fluid separator elements;
   wherein the worm-like segment has a length not greater than 0.5 times a pitch of the worm-like segment.

22. A method of forming a fluid separation device, comprising:
   providing a base carrier having a plate-like shape;
   integrally forming at least two fluid separator elements in said base carrier;
   providing each fluid separator element with an integrally formed flow-through tube having an axial gas inlet, an axial common gas and fluid outlet;
   forming one wall of one of said flow-through tubes of one fluid separator elements so as to form a wall of one of said flow-through tubes of another of said fluid separator elements;
   locating an integrally formed worm-like segment between said axial gas inlet and said axial common gas and fluid outlet;
   forming said worm-like segment with screw thread surfaces, said surfaces defining at least one gas flow path with an inner wall of said flow-through tube; and
   providing said worm-like segment with a length not greater than 0.5 times a pitch of said worm-like segment.

23. The fluid separation device of claim 1, wherein said gas inlet is an axial gas inlet and said gas outlet is an axial outlet for gas and fluid.

* * * * *